No. 652,109. Patented June 19, 1900.
E. G. HEWITT.
SUN DIAL.
(Application filed Dec. 26, 1899.)
(No Model.)
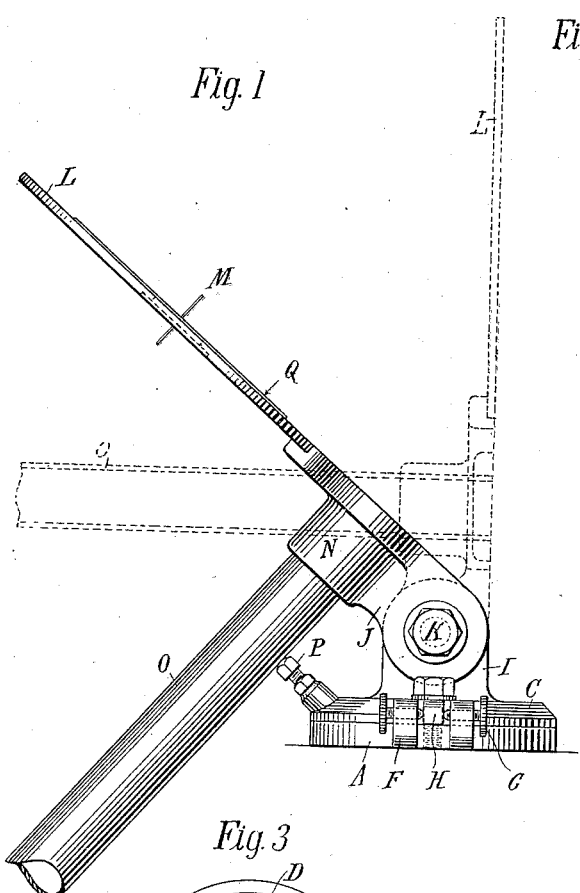
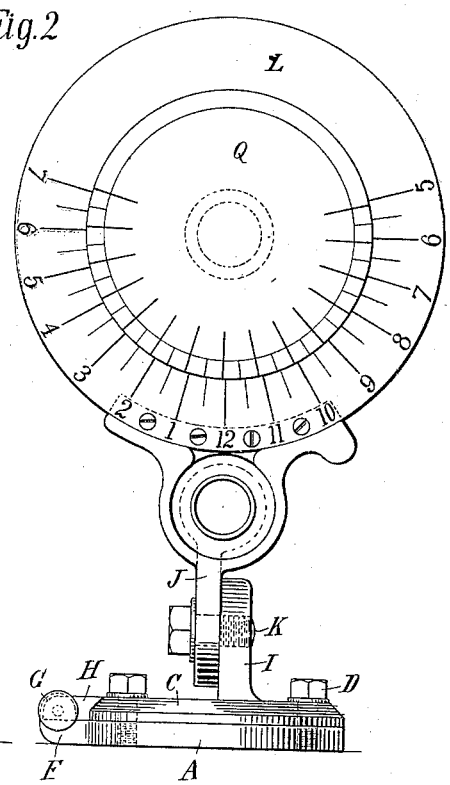
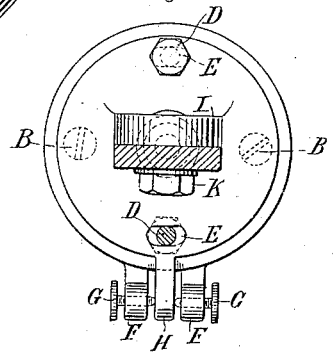
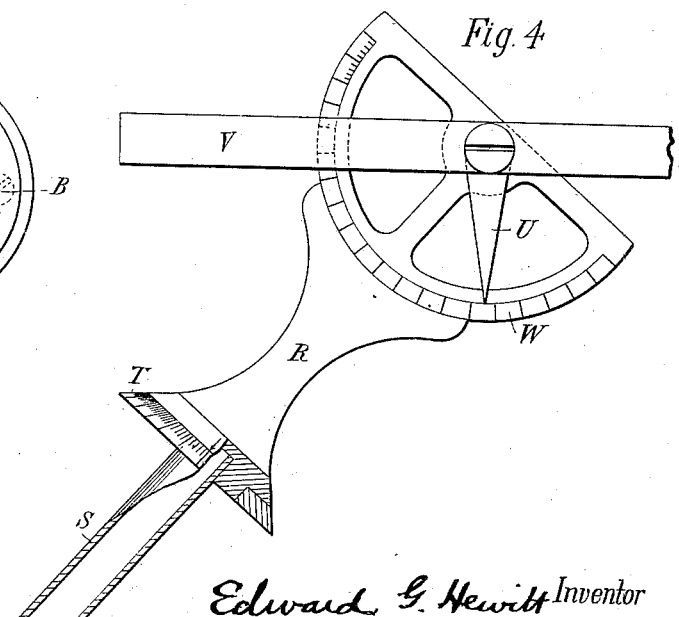
Witnesses:
Raphaël Netter
M. Lawson Dyer
Edward G. Hewitt Inventor
by Kerr, Page & Cooper
Attys.
THE NORRIS PETERS CO., PHOTO-LITHO., WASHINGTON, D. C.

UNITED STATES PATENT OFFICE.

EDWARD G. HEWITT, OF NEW YORK, N. Y.

SUN-DIAL.

SPECIFICATION forming part of Letters Patent No. 652,109, dated June 19, 1900.

Application filed December 26, 1899. Serial No. 741,508. (No model.)

*To all whom it may concern:*

Be it known that I, EDWARD G. HEWITT, a citizen of the United States, residing at New York, (Brooklyn,) in the county of Kings, in the State of New York, have invented certain new and useful Improvements in Sun-Dials and Attachments Therefor, of which the following is a specification, reference being had to the drawings accompanying and forming a part of the same.

The invention which forms the subject of my present application is an apparatus which I call an "astrometer," primarily designed for indicating time, but useful as an educational appliance for the teaching of astronomy, for determining the position of the heavenly bodies, or finding any of such bodies from known astronomical data.

The improvement consists in an adjustable plate or dial with attachments by means of which the plate may be readily brought and fixed parallel to the plane of the equator and by means of the attachments right ascension and declination of any star or other heavenly body may be readily ascertained, such attachments consisting mainly of a tube or a telescope adapted to be inserted in a tube fixed at right angles to the dial for finding the true north by observation of the polar star and a device adapted to be inserted in the tube when the dial has been set for giving the right ascension and declination of any star or finding any star from these data.

The apparatus is illustrated in the accompanying drawings, in which—

Figure 1 is a side elevation of the dial and its fixed attachments. Fig. 2 is a front view of the same. Fig. 3 is a plan view of the base or support for the dial, and Fig. 4 is a side view of the star-finding attachment.

The device is designed to be set on and secured to any fixed support, such as a post, by means of a plate A, through which screws B (shown in dotted lines in Fig. 3) may be passed. On this plate rests a second plate C, which is secured to the former by screw-bolts D, passing through slots E in the upper plate and entering tapped holes in the other. Lugs F extend from the edge of the under plate and carry adjusting-screws G, which engage with a tongue H, extending from the plate C. On the plate C is a standard I, to which is secured a casting J by a screw-bolt K, passing through a flat lug forming part of the casting. A circular dial L is secured to the casting J, and at the center of the same, which is in the vertical plane passing through the center of the plate C, is a pin M, extending for a short distance on opposite sides of the dial. The dial L is marked off in equal divisions, numbered to designate divisions of time. It will be understood that these graduations are marked on both sides of the dial.

As thus far described the instrument, aside from the details of construction, constitutes a sun-dial of a well-known type, upon which the shadow cast by the pin M, when the dial is properly set, will indicate sun-time.

In the casting J is a socket N, in which is set a finder or sighting tube O, which may be a telescope or a tube adapted to receive a telescope, so that its axis will be perpendicular to the plane of the dial.

The device is set up by placing and securing it as nearly as possible in the equatorial plane, with the pin M pointing toward the north star. Then by means of the telescope the screws G and a screw P, set in the plate C and affording a support or stop for the tube O, fine adjustments are secured, which place the dial exactly in the equatorial plane, with the pin M pointing to the true north. The field of the telescope is of such extent as to just permit the pole-star to be seen in it at all points in its apparent orbital path, so that, knowing the position of the star at the time of observation or by making several observations, a very close approximation to the true north may be attained, and in which case the pole-star will appear to revolve around the edge of the telescopic field.

Q is a circular plate which may be placed over the pin M in either side of the dial. Its edge is marked off in equal divisions corresponding to those on the dial and similarly marked if so desired. By placing this plate over the dial and adjusting it at frequent intervals with reference to the graduations on the dial, according to the longitude and the data obtainable from a nautical almanac, the position of the shadow on it will show clock or standard time.

It will be understood that the shadow will be cast by the sun on the upper or the lower side of the dial, according as the sun may be above or below the plane of the equator.

When the dial has been once set, the telescope may be removed, and in order to use the instrument at night I have devised the attachment shown in Fig. 4. This consists of a standard R, having a tube or rod S extending therefrom, which fits into the tube O when the telescope has been removed. Surrounding the lower edge of the base of the standard R is a ring T, marked off in a scale of equal parts or degrees and movable freely on said base. V is a telescopic tube or a bar which serves as a finder, pivoted to the standard and carrying a pointer U, which sweeps over a scale of degrees W. When this device is placed in the tube O, the axis of which points to the true north, the declination of any heavenly body to which the finder V may be directed will be indicated on the scale W. The right ascension of such body will be shown by the position of a mark on the standard R with reference to the scale of degrees on the ring T, which, having been adjusted to position, is held or fixed by any proper means, so as not to turn with the standard R.

Many other instructive and useful applications of the instrument are possible and will suggest themselves to those familiar with the use of apparatus of this kind.

The device is adapted to any latitude and is readily adjusted for its intended uses at any place.

What I claim as my invention is—

1. In a sun-dial the combination of a base-plate, a dial-support horizontally adjustable thereon, a dial having a vertical angular adjustment and a finder or sight tube fixed to the dial with its axis perpendicular thereto, as set forth.

2. In a sun-dial the combination of a base-plate, a plate thereon capable of limited horizontal adjustment, a dial supported by the last-named plate and capable of vertical angular adjustment, and a finder or sight tube fixed to the dial with its axis perpendicular thereto.

3. The combination with a sun-dial of the kind described having a finder or sight tube fixed thereto with its axis perpendicular to the dial-plate, of a star-finding attachment adapted to fit into the said tube and provided with right ascension and declination scales, as set forth.

4. The combination with a sun-dial of the kind described, having a finder or sight tube fixed thereto with its axis perpendicular to the dial-plate, of a standard, a finder mounted thereon and adjustable in a vertical plane and carrying a pointer that travels over a declination-scale, the standard being adapted to be fitted into the finder-tube and rotated therein, and a scale marked in right ascension, concentric with the axis of the standard, as set forth.

EDWD. G. HEWITT.

Witnesses:
M. LAWSON DYER,
BENJAMIN MILLER.